No. 866,966. PATENTED SEPT. 24, 1907.
J. P. REINECKE.
INSTANTANEOUS WATER HEATER.
APPLICATION FILED AUG. 29, 1906.
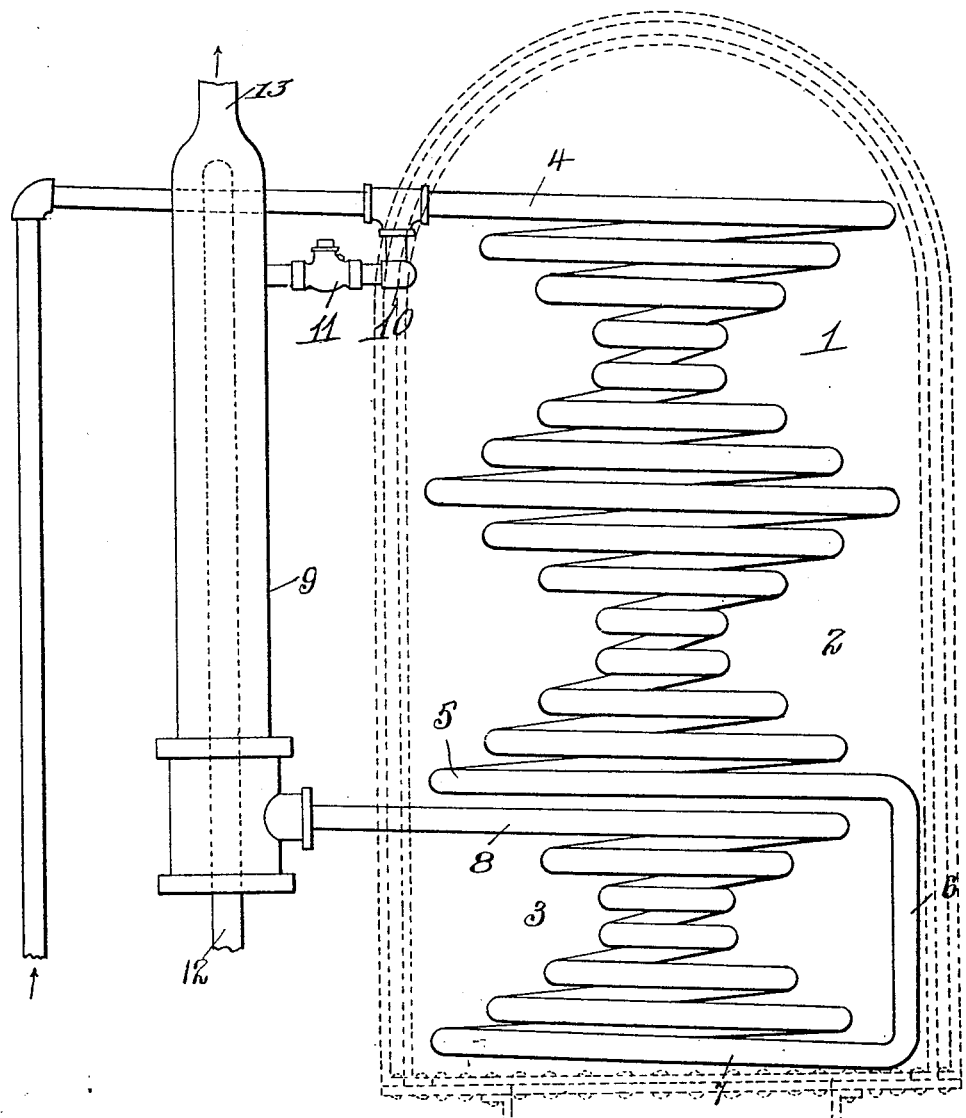

UNITED STATES PATENT OFFICE.

JOHN P. REINECKE, OF IDLEWOOD, PENNSYLVANIA, ASSIGNOR, BY MESNE ASSIGNMENTS, OF ONE-HALF TO PITTSBURG WATER HEATER COMPANY, OF ALLEGHENY, PENNSYLVANIA, A CORPORATION OF NEW JERSEY.

INSTANTANEOUS WATER-HEATER.

No. 866,966.     Specification of Letters Patent.     Patented Sept. 24, 1907.

Application filed August 29, 1906. Serial No. 332,419.

*To all whom it may concern:*

Be it known that I, JOHN P. REINECKE, a citizen of the United States of America, residing at Idlewood, in the county of Allegheny and State of Pennsylvania, have invented certain new and useful Improvements in Instantaneous Water-Heaters, of which the following is a specification, reference being had therein to the accompanying drawing.

My invention relates to instantaneous hot water heaters and the means for controlling the gas for the burners and has for its objects; to provide an arrangement of coils and a thermostatic valve wherein a perfect control is secured without exposing the thermostat directly to the heat of the burners; and to provide an arrangement of coils and external thermostat wherein an effective circulation of hottest water about the thermostat is secured at all times. These and other advantages are secured by my invention, one form of which is illustrated in the accompanying drawing in which the figure is a side view of the heater and thermostat, the casing of the heater being shown in dotted lines.

Referring to the drawing, 1, 2 and 3 are sets of coils constituting the boiler or heater, 4 is the inlet pipe for the cold water, 5 is the lower coil of the set 2 which coil is connected by the pipe 6 to the lower coil 7 of the set 3, 8 is the outlet pipe for the hot water leading from the upper portion of the set 3, 9 is the thermostat of conventional form which thermostat is provided with a controlling rod 12 for operating the gas valve for the burners (not shown), 10 is a pipe connecting the upper end of the thermostat with the cold water inlet pipe 4, 11 is a check valve adapted to permit of a flow of water through the pipe 10 into the pipe 4 but to prevent backflow through such pipe, 13 is the outlet from the thermostat from which the hot water is conducted.

From the foregoing construction it will be seen that the placing of the thermostat 9 on the outside of the boiler is possible because of the effective circulation through such thermostat of the hottest water which insures a perfect control of the gas valve. Even when there is no water flowing from the outlet 13 there is a perfect circulation through the thermostat 9 because of the connection 10 between the upper part of the thermostat and the pipe 4, which circulation is caused by the tendency of the very hot water in the set of coils 3 to rise and pass through the thermostat. It will also be seen that the water issues from the boiler at its maximum temperature for the reason that the pipe 8 is at the hottest part of the heat zone, such pipe being adjacent the tips of the burner flames and such point is hotter even than the lower extremity of the heater. It will also be seen that any danger of a reverse circulation of cold water through the thermostat is avoided by means of the check valve 11. It is further clear that as the hottest water passes through the thermostat an effective control of the gas valve is secured. The arrangement is especially desirable where the usual supplemental valve controlled by the water pressure is used, as in such case if the valve by any reason should be accidentally caught and held open after the flow of water has ceased the gas is cut off by the thermostatic valve which as heretofore explained is controlled by the hottest water in the boiler and will therefore respond immediately in case the pressure control valve fails to act.

Having thus described my invention and illustrated its use, what I claim as new and desire to secure by Letters Patent, is the following:

1. The combination with a thermostat, of a coil tube boiler, having upper and lower sections, a connection from the lower end of the upper section to the lower end of the lower section, an inlet to the upper section, an outlet from the upper end of the lower section passing through the thermostat and a connection having a check valve between the inlet and the thermostat, said check valve permitting a continuous flow through the thermostat, and through said connection to the said inlet when the outlet is closed.

2. The combination with a thermostat, of a coil tube boiler having an inlet to the upper portion and an outlet from the lower portion passing to the thermostat, a connection having a check valve between the thermostat and the upper portion of the boiler, the arrangement of the coils of the boiler and the check valve being such that a continuous flow of water is secured from the lower portion of the boiler through the thermostat, and the connection to the upper portion of the boiler when the outlet from the boiler is closed.

In testimony whereof I affix my signature in the presence of two witnesses.

JOHN P. REINECKE.

Witnesses:
MAX H. SROLOVITZ,
F. O. MCCLEARY.